Dec. 9, 1947.  F. C. GOOD, JR  2,432,307
METHOD OF MAKING UNIVERSAL JOINTS
Filed Oct. 12, 1942
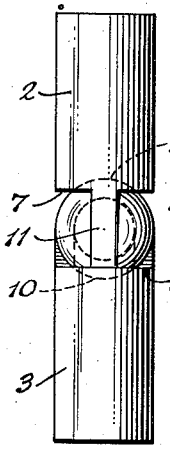
Fig. 1.
Fig. 2.
Fig. 3.
Fig. 4.
Fig. 5.
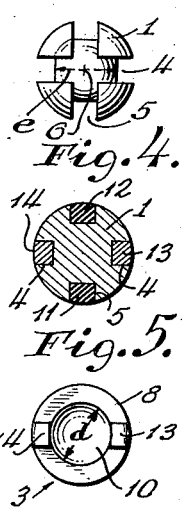
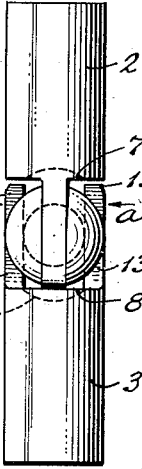
Fig. 6.
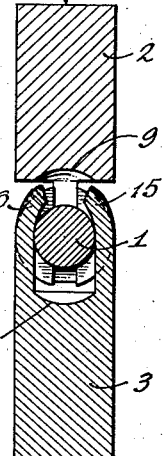
Fig. 6.ª
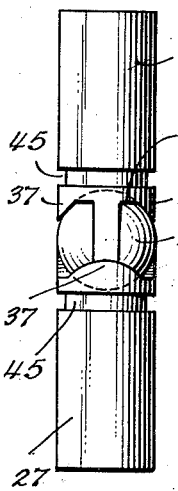
Fig. 7.
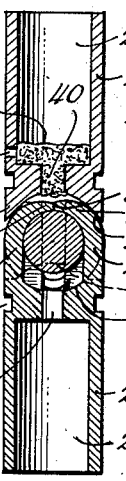
Fig. 8.
Fig. 9.
Fig. 10.
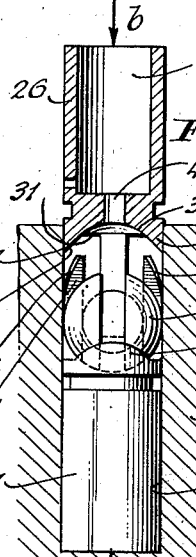
Fig. 11.
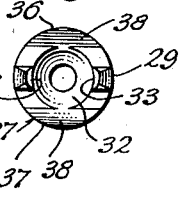
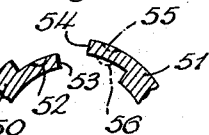
Fig. 12.
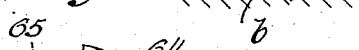
Fig. 13.
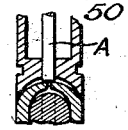
Fig. 8a
Fig. 14.
INVENTOR.
FREDERICK CHARLES GOOD, Jr.
BY Walter S. Olerton
ATTORNEY Patented Dec. 9, 1947

2,432,307

UNITED STATES PATENT OFFICE 2,432,307

METHOD OF MAKING UNIVERSAL JOINTS

Frederick Charles Good, Jr., Cheltenham, Pa.

Application October 12, 1942, Serial No. 461,672

1 Claim. (Cl. 29—148)

The invention relates to a method of making a universal joint for the transmission of a torque between two shafts whose axes include an angle, or for the self-adjustment, in a common plane of two members having intersecting axes.

An object of the invention is to provide a method of making a universal joint made of a minimum number of pieces, and which is simple in design and manufacture, and which combines great strength with low weight, so as to be particularly useful in aircraft and similar structures.

Another object of the invention is to provide a method of making a universal joint which is particularly applicable for mass production even where narrow tolerances are prescribed and highly skilled workmen are scarce.

The invention consists of a universal joint comprising three pieces, viz., a crosswise grooved ball and two shank- or socket-like members having fingers or prongs which engage the ball so as to embrace it from opposite sides. The invention further consists of a universal joint wherein each of the shank-like members embodies a socket face for the ball, which face is useful in the manner of a die to guide the prong ends of the other shank member during the bending of the prongs into their final shape. According to the novel method of the invention the final shaping of the prongs is accomplished by bringing the prong ends of each shank between the ball and the adjacent face of the other shank and exercising axial pressure whereby the prongs will be bent into their desired shape.

Further objects and details of the invention will be apparent from the description given hereinafter and the appended drawing illustrating two embodiments thereof by way of example.

In the drawing,

Fig. 1 is a side elevation of an embodiment of the invention,

Fig. 2 is a longitudinal cross-section thereof,

Fig. 3 is a top plan view of the ball of the joint,

Fig. 4 is a cross-section along line 4—4 of Fig. 2,

Fig. 5 is a top plan view of one of the shank members prior to the assembling,

Fig. 6 is an illustration of the parts in one of their relative positions during the assembling, Fig. 6a illustrates another step during the assembling, Figs. 7 to 10 are views similar to Figs. 1, 2, 3 and 5, respectively, of another embodiment, showing the preferred form of the invention. Fig. 8a is a fragmentary, diagrammatic view illustrating the ultimate closing of the arm ends by means of a punch.

Fig. 11 is an illustration, similar to Fig. 6, of the preferred form,

Figs. 12 to 14 illustrate three different modifications of the ends of the prongs of a shank member.

Referring now to the drawing, Figs. 1 to 6, the universal joint consists of the ball 1 and the two shank-like members 2 and 3, which may have any suitable shape according to the type of members which are intended to be connected by the joint. In most instances, the two members 2 and 3 will be equal in size and shape. However, in certain cases they may be different from each other except for those portions which will be expressly described hereinafter. The ball 1 is provided with two peripheral grooves 4 and 5 crossing each other at right angles at 6 and similarly at a point diametrically opposite the intersection visible in Fig. 3. In the illustrated embodiment, the shank members 2 and 3 are cylindrical pieces with front faces 7 and 8, respectively. Each face is provided with a centrally located, spherical concavity, 9 and 10, respectively, whose radius is preferably equal to that of the ball 1 whereas the diameter $d$ of the top rim of the concavity (see Fig. 5) is preferably similar to the diameter $e$ of the bottom of the grooves 4 and 5 of the ball in Fig. 3. Two prong-like extensions project from each of the faces 7 and 8, those of the member 2 being denoted by 11 and 12 and those of member 3 by 13 and 14. At their roots, i. e., close to the face 7, prongs 11 and 12 are spaced from each other a distance similar to the diameter $e$ of the bottom of the ball grooves, and the prongs 13 and 14 are similarly spaced. The cross-section of the prongs is substantially according to that of the grooves and their length should be so selected that they can be bent into their final shape and position as hereinbelow described. The prongs 11 and 12 engage the groove 5 and the prongs 13 and 14 engage the groove 4. The free ends of each pair of prongs are so bent towards each other that they abut against each other and are embedded in the coordinate groove between the groove bottom and the spherical concavity of the other shank. This is clearly shown in Fig. 2 where the ends 15 and 16 of the prongs 13 and 14, respectively, of shank 3 abut at 17 against each other and are located between groove 4 and the bottom of the concavity 9. Consequently, the ball with shank 3 and prongs 13 and 14 can be turned a limited angle in the concavity 9 about its center in the plane defined by the prongs 11 and 12, and can also be turned with shank 2 and prongs 11 and 12 a limited angle in the concavity 8 about its center in the plane defined by the prongs 13 and 14. Thus, the connection of the three parts constitutes a universal joint of the desired type.

In the production of the universal joint, the ball 1 and shanks 2 and 3 are made by any suitable and conventional working operations according to the forms shown in Figs. 3, 5 and 6, that is to say, with the prongs 11 to 14 straight-lined and parallel with the axis of the shank from which they project. Then, the parts are brought into the position illustrated in Fig. 6 where the prongs engage the coordinate grooves of the ball and their ends are at a short distance from the faces 7 and 8 of the respectively opposite shanks 2 and 3. Thereafter, the ends 15 and 16 of the prongs 13 and 14 are slightly bent inward in the direction of the arrows $a$ into the position of Fig. 6a where they are just in registry with the concavity 9 of the opposite shank 2. Similarly, the ends of the prongs 11 and 12 are bent into registry with the cavity 10 of shank 3. Thereafter, pressure in axial direction indicated by arrows $b$ in Fig. 6a is exercised with the effect that the free prong ends engage the concavities 9 and 10 which act like dies and, in conjunction with the ball grooves, shape the prong ends into their final form shown in Fig. 2.

In the preferred form of the invention illustrated in Figs. 7 to 11, the ball 21 in Fig. 9 is similar to that of Fig. 3 with the difference however, that the bottoms 22 and 23 of the grooves 24 and 25, respectively, are curved so as to form spherical zones. The two shanks 26 and 27 are alike. Each shank is shaped as a cylindrical body provided with a bore 28 throughout the major portion of its length. Prongs 29 and 30 in diametrical arrangement project from a flat portion 31 of the front of the shank. The inner sides 33 of the prong cross-sections are curved according to the bottom 22 or 23 of the coordinate ball groove, and the free ends 34 are chamfered at 35 from the outside towards the inside as clearly shown in Fig. 11. A spherical concavity 32 is provided, centrally between the roots of the prongs, and similarly to the concavity 10 of shank 3 in the first embodiment, so as to serve as a socket for the ball 21. There are further a pair of lips or lugs 36 and 37 projecting from the front of each shank in diametrical opposition to each other so that the diameter on which their centers are located is at right angles to the plane of the prongs of the same shank. Each lug has a face 38 slanting from the periphery of the shank to that of the top rim of the cavity 32 so that the intersection of the face 38 with the plane 31 substantially forms a tangent of the rim of said cavity. In the finished joint, the ends 34 of each pair of prongs abut at 39 and are embedded in the coordinate ball groove between the bottom of the latter on the one side, and one of the lugs and the concavity of the other shank on the other hand, as clearly shown in Fig. 8. For purposes to be explained hereinafter, a bore 40 of relatively small diameter may be provided so as to offer a passage from the bore 28 to the center of the concavity 32.

The production of the shanks appearing to be of rather complex shape is in fact very simple. Starting from a cylindrical piece of the length of a shank including its prongs, such piece may be provided with bores from both ends, the one being the bore 28, the other having a diameter equal to the rim of the concavity 32 which may be formed more or less during the same operation. It will be noticed that by boring the piece to the said rim diameter, the inner faces 33 of the prongs will be correctly shaped so as to fit the bottom 22 of the ball grooves. The passage 40 can also be provided during such boring or drilling operation. The shaping of the side walls of the prongs and the lug faces 38 can then be accomplished in a simple milling operation.

The parts, thus or otherwise produced, are brought into their relative position illustrated by Fig. 11 in which shank 27 and ball 21 are shown in side elevation, whereas shank 26 is shown in longitudinal cross-section, the prongs still in their straight shape being in engagement with their coordinate ball grooves. It will be noticed that in this position, each of the prongs of the one shank is with its chamfer 35 opposite and in registry with the face 38 of one of the lugs of the other shank. If, now, the parts are compressed in the axial direction of arrows $b$, the ends 34 will slide along the faces 38 to be thereby conducted into the cavity 32 and to be bent into their final shape of Fig. 8. In order to prevent the prongs from buckling outwardly a holder indicated at 41 and provided with a bore 42 equal in diameter to that of the shanks may be applied during the compression of the pieces. Thus, the provision of the lugs 36 and 37 makes it unnecessary to apply bending pressure by extraneous means in the direction of the arrows $a$ of Fig. 6 before the axial pressure is exercised. The finished joint has a working range from about 25 to about 40 degrees depending on the size of the cross-section of the prongs, i. e., depending on the required strength of the joint. In certain instances it may happen that the lugs 36 and 37 abut against the adjacent prongs when the working angle of the joint, that means the angle between the axes of the two shanks, surpasses a certain maximum. In that event the lugs may be partly or entirely removed after the shaping of the prongs by axial compression has been completed, and it will be clear that after the removal of the lugs, the joint of Fig. 7 will appear in the form shown in Fig. 1.

It has been stated hereinbefore that a passage 40 may be provided between bore 28 and concavity 32. This may be used for the insertion of a tool such as a punch "A" in order to force the ultimate prong ends in engagement with the groove bottom after or during the axial compression as indicated in Fig. 8. However, this is not necessary because no part of the prong ends can project beyond the periphery of the ball owing to the die effect of the concavity 32 as hereinbefore described. If so desired, the ends of each pair of prongs may be spot welded together in which event the passages 40 are also used for the application of the welding tool. In the finished joint the passage 40 may serve in lubricating the parts. For this purpose, a piece 43 of felt or similar material as the carrier of a lubricant may be inserted in bore 28 and passage 40, as shown in Fig. 8 in connection with shank 26, and the lubricant may be replenished through a hole 44 in the wall of the shank. Furthermore, each shank may be provided with a peripheral groove 45 for the attachment of a cover (not shown) to protect the joint from sand and dust and to keep in the oil as well known in the art.

In certain instances it may be desirable to interlock the ends of a pair of prongs or to connect them in a manner other than welding. Examples of such connections are shown in Figs. 12 to 14. In Fig. 12, the opposite ends 50 and 51 of a pair of prongs are so shaped as to overlap each other when brought together. The end 50 is provided with an indentation 52 on the top side of its tongue 53. If now, the parts are brought together so that tongue 54 of the end 51 overlaps tongue 53, the tongue 54 may be punched at 55 whereby some material will be driven to project at 56 from the lower face of the tongue 54 so as to engage the indentation 52. The parts are shown in Fig. 12 separate from each other in order to facilitate the explanation. In Fig. 13 the prong ends 60 and 61 have also overlapping tongues 63 and 64, provided with counter sunk bores 65 and 66. When in the final position the tongues overlap, the bores 65 and 66 are in registry so that a piece of wire (not shown) can be inserted and hammered to form a rivet connecting the two ends. Fig. 14 shows a similar rivet connection 72 of the prong ends 70 and 71. In this case, however, the ends engage each other with slanting faces 73 rather than with stepped overlaps shown in the preceding examples. The universal joint hereinbefore described has been found to have a strength and safety several times those of conventional universal joints of equal size. It is much simpler in structure and in assembling than the joints hitherto in use. It can be produced faster and more accurately, and can be made by less skilled labor due to the possibility of using automatic machinery for all or almost all operations of the production.

Although I have described two embodiments in the foregoing it will be apparent to those skilled in the art that many modifications and alterations can be made within the spirit and essence of the present invention, which, therefore, shall be limited only by the scope of the appended claim.

I claim:

The method of making a universal joint from a ball containing intersecting peripheral grooves and shanks having concave faces with arms projecting rectilinearly from such shanks and having narrowed ends, each of said shanks having an axial aperture therethrough, which comprises seating the arms of the respective shanks in the respective grooves of the ball, moving said shanks toward one another with the ends of the arms of one shank engaging the concave face of the other shank and thereby bending said arms into contacting relation with one another around said ball while constricting said arms against outward bulging, and applying pressure to the narrowed ends of said arms through said axial apertures.

FREDERICK CHARLES GOOD, Jr.

REFERENCES CITED

The following references are of record in the file of this patent:

UNITED STATES PATENTS

| Number | Name | Date |
|---|---|---|
| 1,381,214 | Mohr | June 14, 1921 |
| 1,522,787 | Meier | Jan. 13, 1925 |
| 2,024,912 | Curtis | Dec. 17, 1935 |
| 2,030,074 | Poole | Feb. 11, 1936 |
| 2,113,441 | Curtis et al. | April 5, 1938 |
| 2,213,690 | Caldwell | Sept. 3, 1940 |
| 2,219,591 | Hiester | Oct. 29, 1940 |